US007946596B2

(12) United States Patent
Hsu et al.

(10) Patent No.: US 7,946,596 B2
(45) Date of Patent: May 24, 2011

(54) MOTOR VEHICLE AND RICKSHAW AND TILTING MECHANISM THEREOF

(75) Inventors: Mau-Pin Hsu, Taipei (TW); Chia-Ming Wu, Taipei (TW); Chia-En Lee, Taipei (TW); Ta-Chan Peng, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 12/534,769

(22) Filed: Aug. 3, 2009

(65) Prior Publication Data
US 2010/0032915 A1 Feb. 11, 2010

(30) Foreign Application Priority Data

Aug. 5, 2008 (TW) ................................ 97129649 A (51) Int. Cl.
*B60G 17/015* (2006.01)
(52) U.S. Cl. ............... 280/5.509; 280/5.514; 280/6.154; 280/6.155; 280/6.16
(58) Field of Classification Search ............... 280/5.508, 280/5.509, 5.514, 6.154, 6.155, 6.16
See application file for complete search history.

(56) References Cited

U.S. PATENT DOCUMENTS

| 4,152,004 | A  | * | 5/1979  | Schroder .................... 280/6.154 |
| 4,351,410 | A  | * | 9/1982  | Townsend .................... 180/210 |
| 4,580,797 | A  | * | 4/1986  | Ericsson .................... 280/5.508 |
| 5,116,069 | A  | * | 5/1992  | Miller ........................ 280/5.509 |
| 5,447,331 | A  | * | 9/1995  | Barnhart .................... 280/6.157 |
| 5,813,697 | A  | * | 9/1998  | Bargenquast et al. ......... 280/754 |
| 6,435,522 | B1 | * | 8/2002  | Van Den Brink et al. . 280/5.509 |
| 7,131,651 | B2 | * | 11/2006 | Laursen .................... 280/6.154 |
| 7,568,541 | B2 | * | 8/2009  | Pfeil et al. .................... 180/210 |
| 2008/0238005 | A1 | * | 10/2008 | James ........................ 280/5.509 |
| 2009/0026719 | A1 | * | 1/2009  | Koch et al. ................. 280/5.508 |
| 2009/0174158 | A1 | * | 7/2009  | Anderson et al. .......... 280/5.507 |
| 2009/0312908 | A1 | * | 12/2009 | Van Den Brink .............. 701/38 |

* cited by examiner

*Primary Examiner* — Toan C To (57) ABSTRACT

A motor vehicle is provided. The motor vehicle comprises a vehicle body, a front wheel, a rear wheel and a tilting mechanism. The front wheel, the rear wheel and the tilting mechanism are disposed on the vehicle body. The tilting mechanism comprises a first compensation unit, a first arm, a first wheel, a second compensation unit, a second arm, a second wheel, at least one pipe and a fluid. The first arm is connected to the first compensation unit, and the first wheel. The second arm is connected to the second compensation unit, and the second wheel. The pipe connects the first compensation unit to the second compensation unit. The fluid flows in the first compensation unit, the second compensation unit and the pipe, wherein when the motor vehicle tilts, an extension length of the first compensation unit equals to a compression length of the second compensation unit.

20 Claims, 8 Drawing Sheets

MOTOR VEHICLE AND RICKSHAW AND TILTING MECHANISM THEREOF

CROSS REFERENCE TO RELATED APPLICATIONS

This Application claims priority of Taiwan Patent Application No. 097129649, filed on Aug. 5, 2008, the entirety of which is incorporated by reference herein.

BACKGROUND OF THE INVENTION

1. Field of the Invention

The present invention relates to a motor vehicle, and in particular relates to a motor vehicle resisting inertia of turning over.

2. Description of the Related Art

Conventional motor vehicles for disabled people have a right wheel and a left wheel disposed on two sides thereof to increase stability as the motor vehicle is parking or moving. However, vertical height of the right wheel and left wheel relative to a rear wheel of the motor vehicle is fixed. When the motor vehicle turns a corner at high speeds or acute angles, a torque generated by centrifugal force exceeds a stable torque generated by gravity, and the motor vehicle turns over.

BRIEF SUMMARY OF THE INVENTION

A detailed description is given in the following embodiments with reference to the accompanying drawings.

A motor vehicle is provided. The motor vehicle comprises a vehicle body, a front wheel, a rear wheel and a tilting mechanism. The front wheel, the rear wheel and the tilting mechanism are disposed on the vehicle body. The tilting mechanism comprises a first compensation unit, a first arm, a first wheel, a second compensation unit, a second arm, a second wheel, at least one pipe and a fluid. The first arm is connected to the first compensation unit, and the first wheel. The second arm is connected to the second compensation unit, and the second wheel. The pipe connects the first compensation unit to the second compensation unit. The fluid flows in the first compensation unit, the second compensation unit and the pipe, wherein when the motor vehicle tilts, an extension length of the first compensation unit equals to a compression length of the second compensation unit.

When the motor vehicle of the embodiment turns a corner at high speeds or acute angles, the tilting mechanism provides sufficient centripetal force preventing the motor vehicle from turning over. As well, for non level road surfaces (the left and right wheels have different heights), the motor vehicle of the embodiment provides improved performance.

The tilting mechanism of the embodiment can be detachably disposed from the motor vehicle, and a user can dispose the tilting mechanism on standard motor vehicles. Thus, the tilting mechanism of the embodiment can be popularized, leading to decreasing costs due to economies of scale.

The tilting mechanism of the embodiment can also be utilized on a rickshaw.

BRIEF DESCRIPTION OF THE DRAWINGS

The present invention can be more fully understood by reading the subsequent detailed description and examples with references made to the accompanying drawings, wherein:

FIG. 5b is a sectional view along direction I-I of FIG. 5a;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
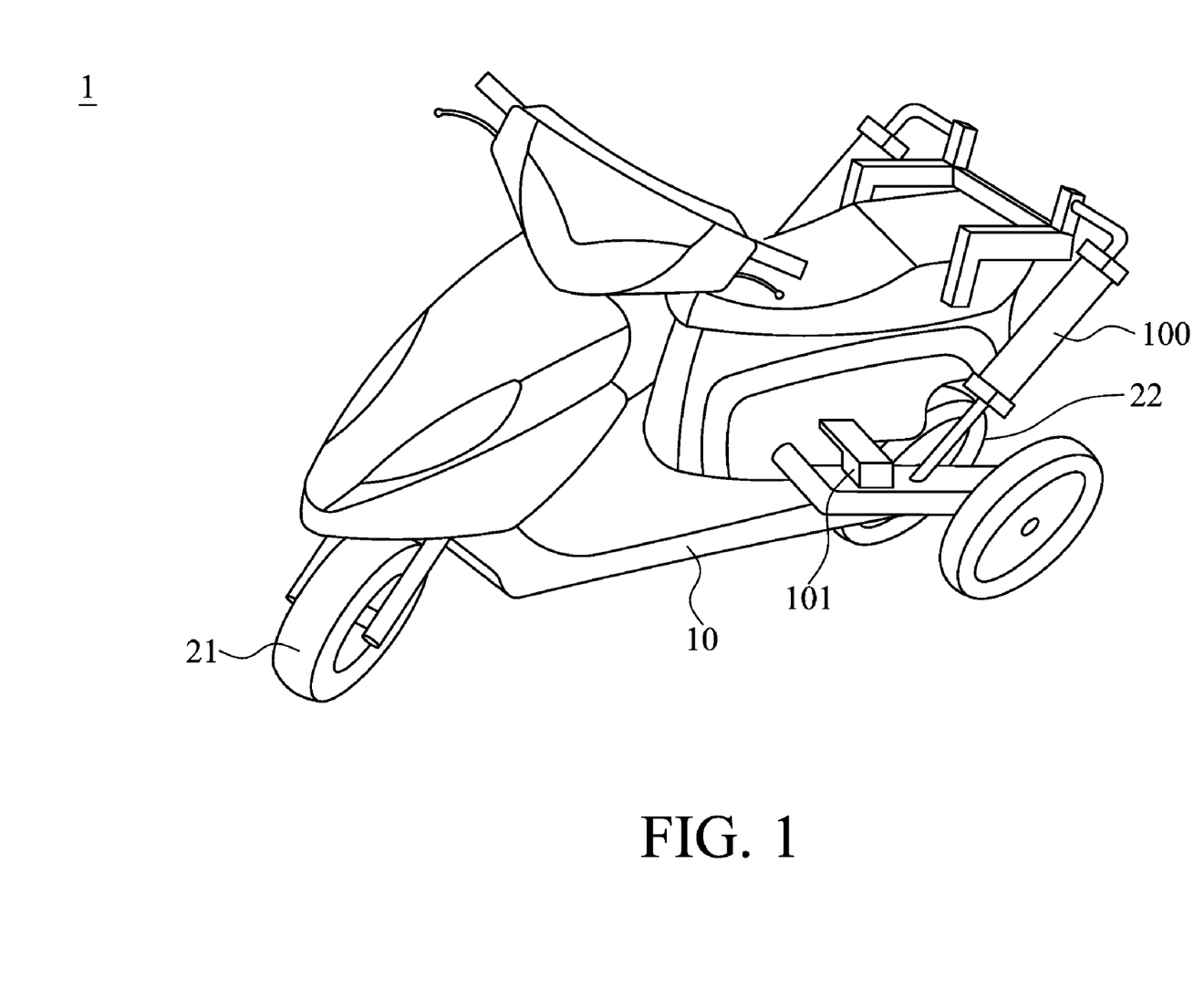
FIG. 1 shows a motor vehicle of an embodiment of the invention.

FIG. 1 shows a motor vehicle 1 of an embodiment of the invention, comprising a vehicle body 10, a front wheel 21, a rear wheel 22 and a tilting mechanism 100. The front wheel 21, the rear wheel 22 and the tilting mechanism 100 are disposed on the vehicle body 10.

Figure 2:
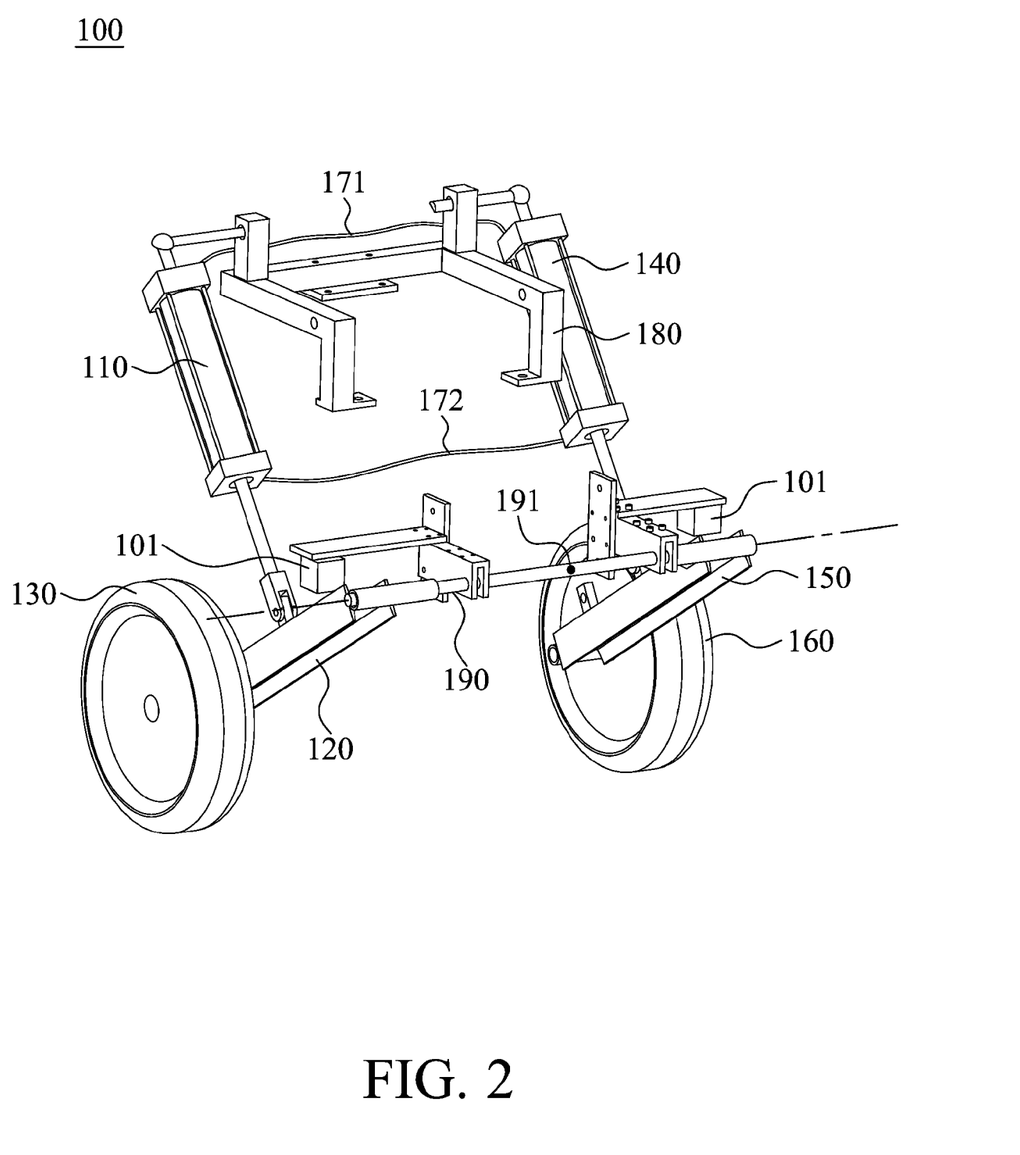
FIG. 2 shows a detailed structure of the tilting mechanism of an embodiment of the invention.

FIG. 2 shows a detailed structure of the tilting mechanism 100 of an embodiment of the invention, comprising a first compensation unit 110, a first arm 120, a first wheel 130, a second compensation unit 140, a second arm 150, a second wheel 160, a pipe 171, a pipe 172, a fixing frame 180 and a fixing shaft 190. The first arm 120 is connected to the first compensation unit 110. The first wheel 130 is connected to the first arm 120. The second arm 150 is connected to the second compensation unit 140. The second wheel 160 is connected to the second arm 150. The pipe 171 and the pipe 172 connect the first compensation unit 110 to the second compensation unit 140. The fixing frame 180 is connected to the first compensation unit 110 and the second compensation unit 140. Universal joints can be disposed between the fixing frame 180 and the first and second compensation units. The fixing shaft 190 is connected to the first arm 120 and the second arm 150. The fixing shaft 190 extends parallel to rotation shafts of the first wheel 130 and the second wheel 160. The fixing shaft 190 comprises a central point 191 located between two ends of the fixing shaft 190.

Figure 3A:
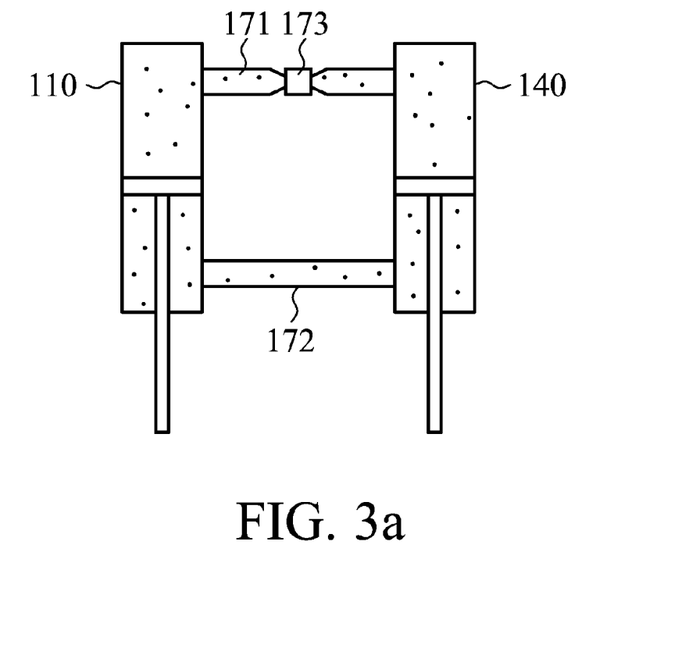
FIGS. 3a and 3b show detailed structures of the first compensation unit and the second compensation unit of an embodiment of the invention.
Figure 3B:
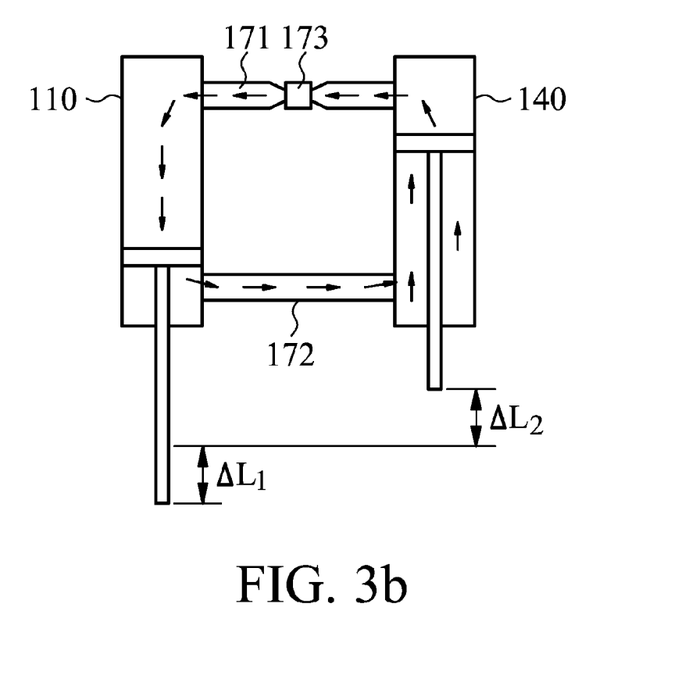

FIGS. 3a and 3b show detailed structures of the first compensation unit 110 and the second compensation unit 140 of an embodiment of the invention. The pipe 171 and the pipe 172 connect the first compensation unit 110 to the second compensation unit 140. The first compensation unit 110 and the second compensation unit 140 can be air cylinders or oil cylinders. A throttle valve 173 can be disposed on a center portion of the pipe 171. The throttle valve 173 is opened in a normal inclination mode, but also can be closed by mechanical or electrical ways to achieve a non-inclination mode. When the motor vehicle of the embodiment tilts, the fluid in the first compensation unit 110 and the second compensation unit 140 is pressed and moved, and the lengths of the first compensation unit 110 and the second compensation unit 140 is changed. With reference to FIG. 3b, an extension length $\Delta L_1$ of the first compensation unit 110 equals to a compression length $\Delta L_2$ of the second compensation unit 140.

Figure 4A:
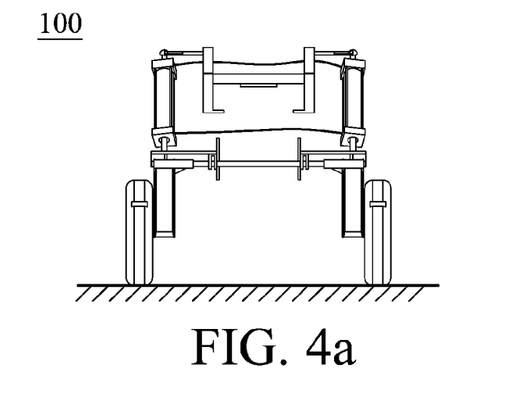
FIGS. 4a-4c show the movement of the tilting mechanism of an embodiment of the invention when the motor vehicle is turning a corner.
Figure 4B:
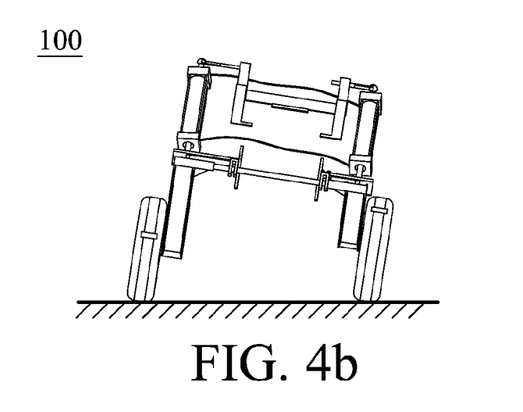
Figure 4C:
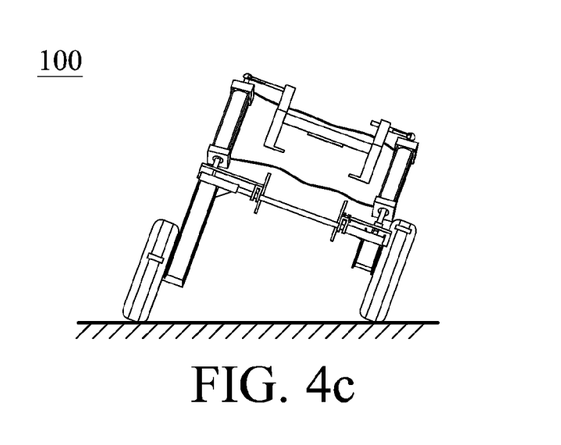

FIGS. 4a-4c show the movement of the tilting mechanism of an embodiment of the invention when the motor vehicle 1 turns a corner. As show in FIGS. 4a-4c, when the motor vehicle 1 turns a corner, the tilting mechanism 100 tilts toward a rotation center to provide centripetal force. When the motor vehicle turns a corner at high speeds or acute angles, the tilting mechanism provides sufficient centripetal force preventing the motor vehicle from turning over. As well, for non level road surfaces (the left and right wheels have different heights), the motor vehicle of the embodiment keeps driver in better riding posture to provide improved performance.

The tilting mechanism 100 can be detachably disposed from the motor vehicle, and user can dispose the tilting mechanism on standard motor vehicles. Thus, the tilting mechanism of the embodiment can be popularized, leading to decreasing costs due to economies of scale.

With reference to FIGS. 1 and 2, the tilting mechanism 100 of the embodiment further comprises a restriction block 101. The restriction block 101 is disposed on the fixing shaft 190. When the motor vehicle tilts to a limit angle, the restriction block 101 abuts the first arm 120 or the second arm 150 to restrict a tilt angle of the motor vehicle.

Figure 5A:
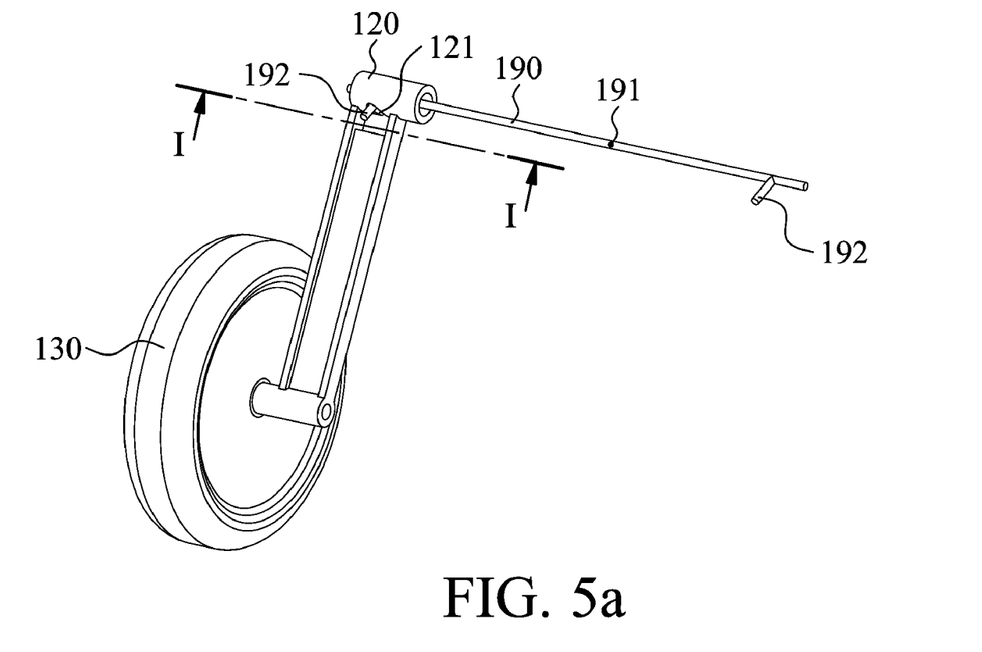
FIG. 5a shows a tilting mechanism of modified embodiment of the invention, wherein the motor vehicle is not tilted.
Figure 5B:
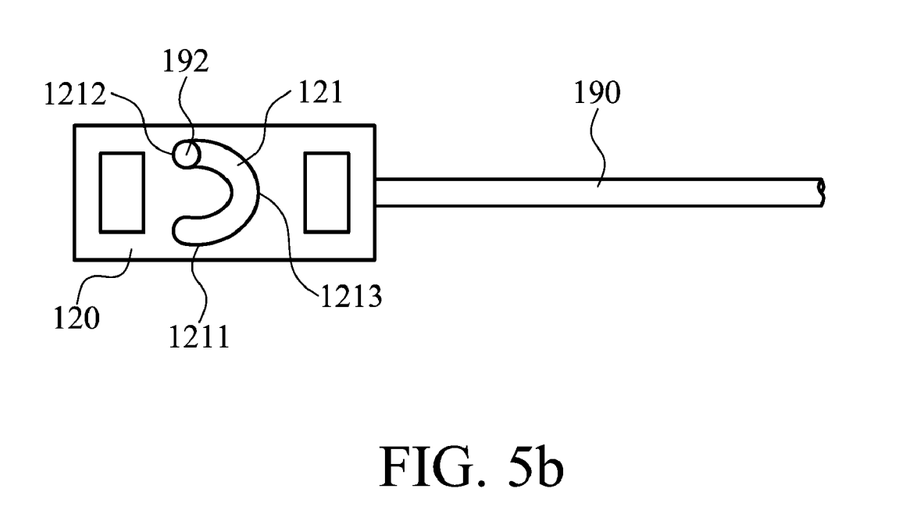
Figure 5C:
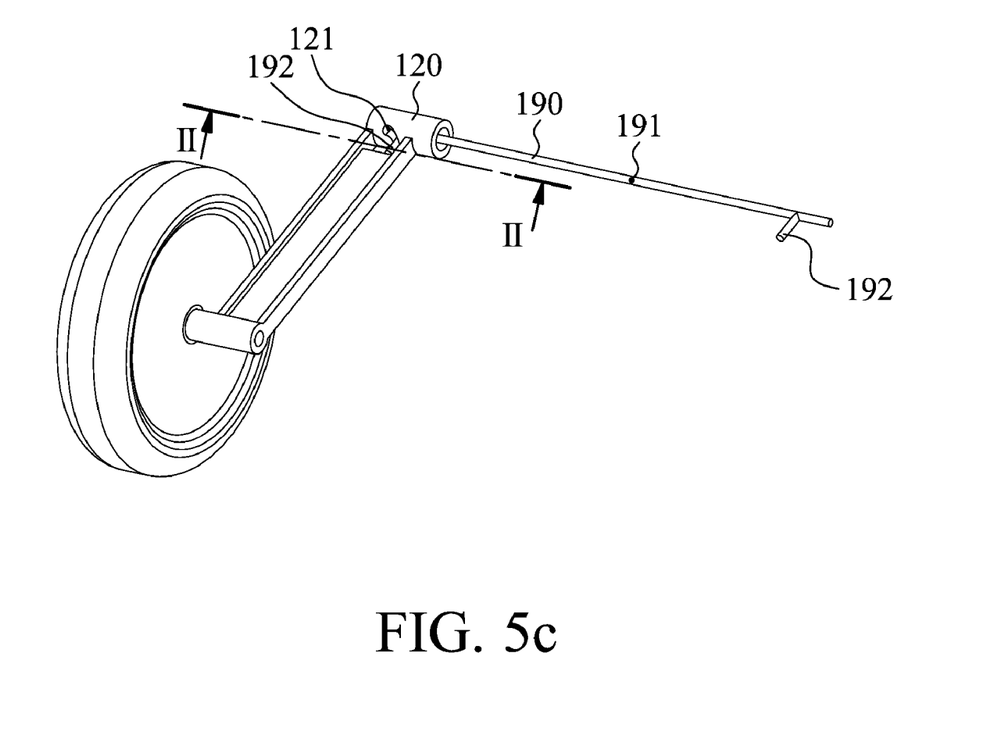
FIG. 5c shows the embodiment of FIG. 5a, wherein the motor vehicle is tilted.
Figure 5D:
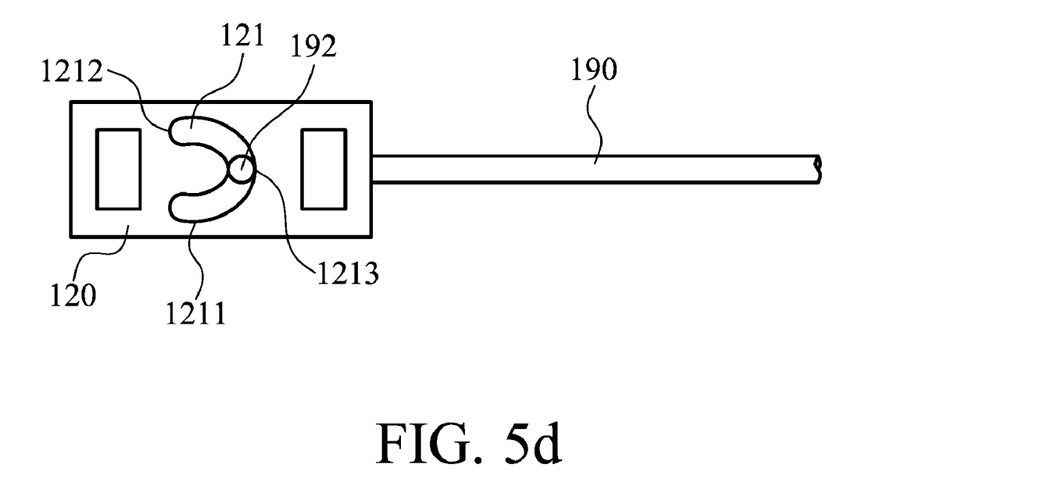
FIG. 5d is a sectional view along direction II-II of FIG. 5c.

FIGS. 5a-5d show a modified embodiment of the invention, wherein the fixing shaft 190 comprises posts 192. The first arm 120 comprises a compensation groove 121. The structure of the second arm is similar to the first arm, and the description thereof is omitted. The fixing shaft 190 is rotated relative to the first arm 120 to slide the post 192 in the compensation groove 121. The compensation groove 121 is curved. With reference to FIGS. 5a and 5b, FIG. 5b is a sectional view along direction I-I of FIG. 5a, wherein the compensation groove 121 comprises a first groove end 1211, a second groove end 1212 and a groove center 1213. A distance between the groove center 1213 and the central point 191 is shorter than a distance between the first or second groove end and the central point 191, and when the motor vehicle tilts toward the first wheel (or the second wheel), the post 192 slides to the first groove end (or the second groove end) to maintain the distance between the first and second wheels. With reference to FIGS. 5c and 5d, FIG. 5d is a sectional view along direction II-II of FIG. 5c. When the motor vehicle is not tilted, the post 192 is located in the groove center 1213.

The groove can be formed on a cylindrical-shaped structure or a cone structure.

Figure 6A:
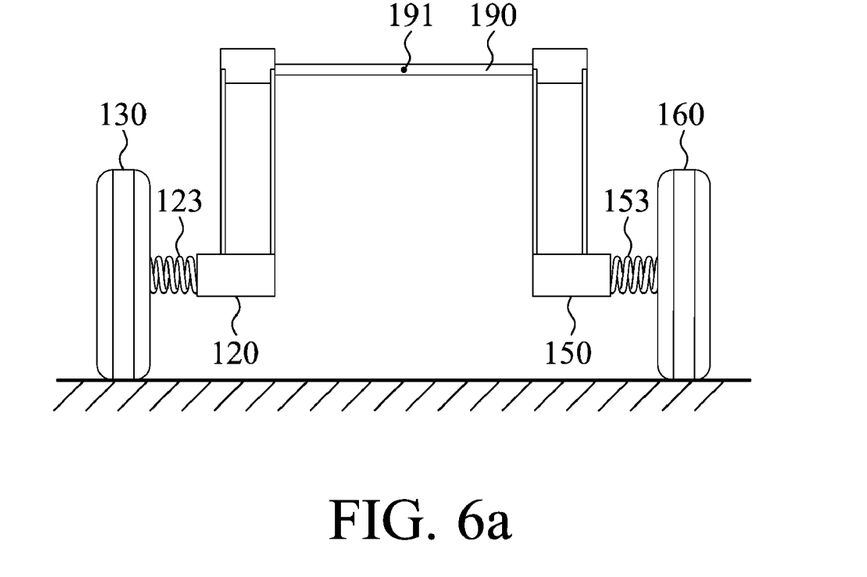
FIGS. 6a and 6b show a tilting mechanism of another modified embodiment of the invention.
Figure 6B:
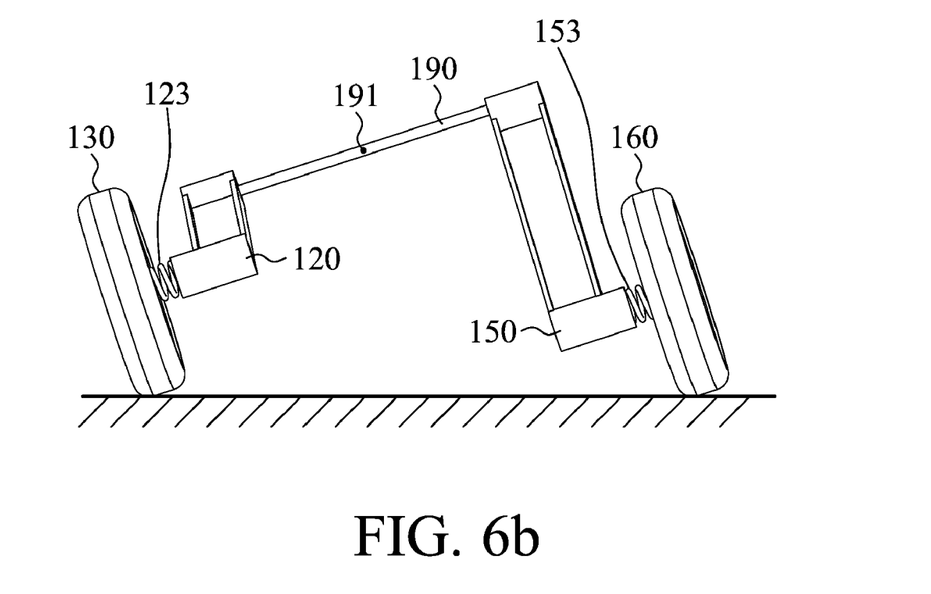

FIGS. 6a and 6b show a tilting mechanism of another modified embodiment of the invention, wherein the tilting mechanism further comprises an elastic compensation element 123 and an elastic compensation element 153, the elastic compensation element 123 is disposed between the first wheel 130 and the first arm 120, and the elastic compensation element 153 is disposed between the second wheel 160 and the second arm 150. When the motor vehicle is not tilted, the elastic compensation element 123 and the elastic compensation element 153 are not compressed. When the motor vehicle tilts, the elastic compensation element 123 and the elastic compensation element 153 are pressed to shorten the distance between the first wheel 130 and the second wheel 160. In the embodiment of the invention, the elastic compensation element 123 and the elastic compensation element 153 are compression springs. The compression springs can be compressed when the vehicle tilts, and cannot be stretched. This device keeps constant the distance between the first wheel 130 and the second wheel 160 on the road when the vehicle tilts. However, the invention is not limited thereby, the invention can be realized by other modified examples.

Figure 7:
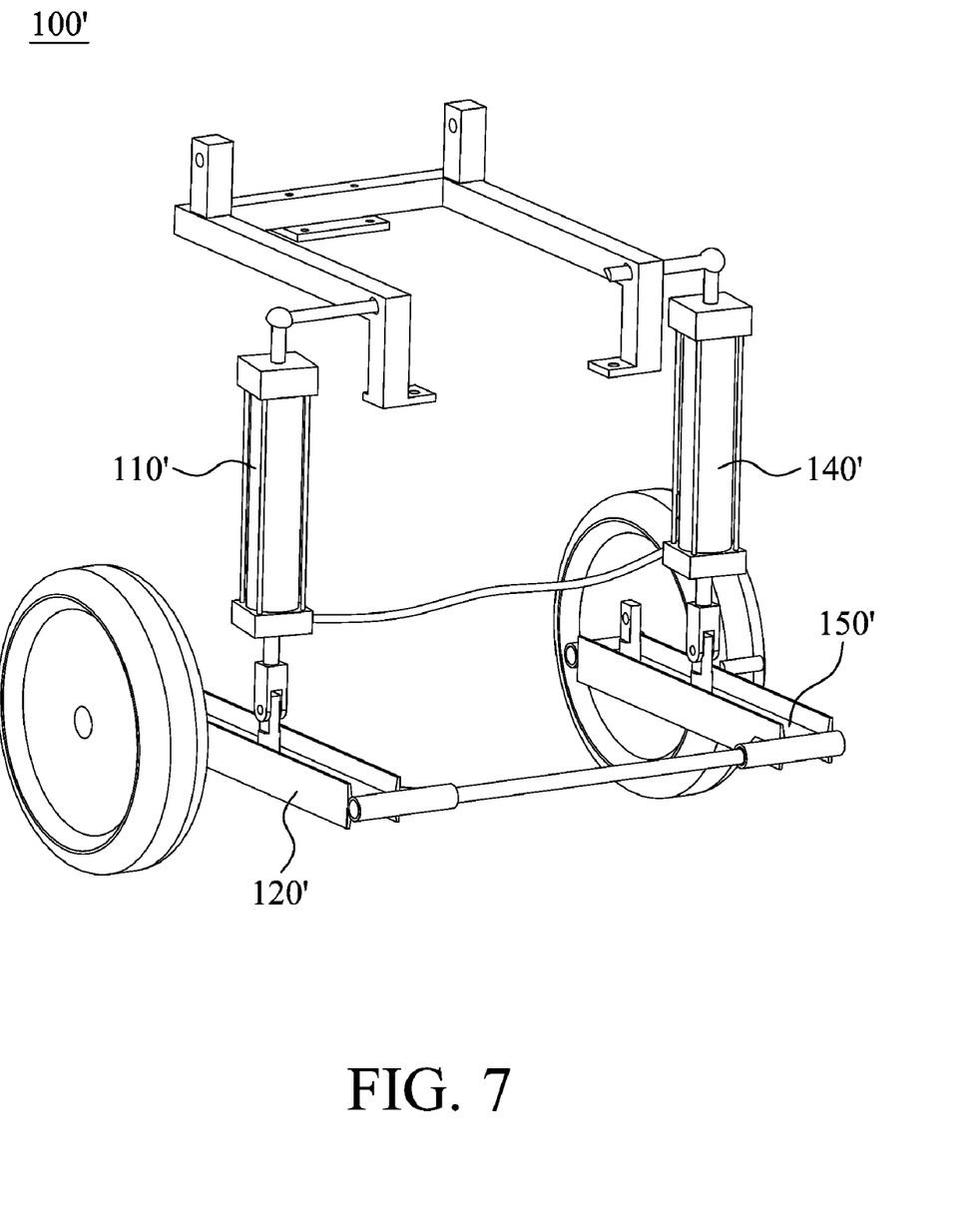
FIG. 7 shows a tilting mechanism of another modified embodiment of the invention.

FIG. 7 shows a tilting mechanism 100' of another modified embodiment of the invention, wherein in an initial position, the first compensation unit 110' is perpendicular to the first arm 120', and the second compensation unit 140' is perpendicular to the second arm 150'. The first arm 120' and the second arm 150' are parallel to a horizontal plane. In the embodiment of FIG. 7, the restriction blocks can be omitted to simplify the structure of the tilting mechanism.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor vehicle, comprising:
    a vehicle body;
    a front wheel, disposed on the vehicle body;
    a rear wheel, disposed on the vehicle body; and
    a tilting mechanism, disposed on the vehicle body, comprising:
        a first compensation unit;
        a first arm, connected to the first compensation unit;
        a left auxiliary wheel, connected to the first arm;
        a second compensation unit;
        a second arm, connected to the second compensation unit;
        a right auxiliary wheel, connected to the second arm;
        at least one pipe, connecting the first compensation unit to the second compensation unit;
        a throttle valve, disposed on the pipe; and
        a fluid, flowing in the first compensation unit, the second compensation unit and the pipe, wherein when the motor vehicle tilts, an extension length of the first compensation unit equals to a compression length of the second compensation unit.

2. The motor vehicle as claimed in claim 1, wherein the first compensation unit and the second compensation unit are air cylinders.

3. The motor vehicle as claimed in claim 1, wherein the first compensation unit and the second compensation unit are oil cylinders.

4. The motor vehicle as claimed in claim 1, wherein the tilting mechanism further comprises a fixing frame, and the fixing frame is connected to the first compensation unit and the second compensation unit.

5. The motor vehicle as claimed in claim 1, wherein the tilting mechanism further comprises a fixing shaft, and the fixing shaft is connected to the first arm and the second arm.

6. The motor vehicle as claimed in claim 5, wherein the fixing shaft extends parallel to rotation shafts of the left auxiliary wheel and the right auxiliary wheel, and the fixing shaft comprises a central point, and the central point is located between two ends of the fixing shaft.

7. The motor vehicle as claimed in claim 6, wherein the fixing shaft comprises a post, the first arm comprises a compensation groove, the post is perpendicular to the fixing shaft, the fixing shaft rotates relative to the first arm to slide the post in the compensation groove, and the compensation groove is curved.

8. The motor vehicle as claimed in claim 7, wherein the compensation groove comprises a first groove end, a second groove end and a groove center, the distance between the first groove end and the central point is greater than the distance between the groove center and the central point, and when the motor vehicle tilts toward the left auxiliary wheel, the post slides from the groove center to the first groove end.

9. The motor vehicle as claimed in claim 6, wherein the tilting mechanism further comprises an elastic compensation element, and the elastic compensation element is disposed between the left auxiliary wheel and the first arm, and when the motor vehicle tilts, the elastic compensation element is compressed to keep the distance between the left auxiliary wheel and the right auxiliary wheel on the road unchanged.

10. The motor vehicle as claimed in claim 9, wherein the elastic compensation element is a compression spring.

11. A tilting mechanism for disposed on a vehicle body, comprising:
    a first compensation unit;
    a first arm, connected to the first compensation unit;
    a left auxiliary wheel, connected to the first arm;
    a second compensation unit;
    a second arm, connected to the second compensation unit;
    a right auxiliary wheel, connected to the second arm;
    at least one pipe, connecting the first compensation unit to the second compensation unit;
    a throttle valve, disposed on the pipe; and
    a fluid, flowing in the first compensation unit, the second compensation unit and the pipe, wherein when the motor vehicle tilts, an extension length of the first compensation unit equals to a compression length of the second compensation unit.

12. The tilting mechanism as claimed in claim 11, wherein the first compensation unit and the second compensation unit are air cylinders.

13. The tilting mechanism as claimed in claim 11, wherein the first compensation unit and the second compensation unit are oil cylinders.

14. The tilting mechanism as claimed in claim 11, wherein the tilting mechanism further comprises a fixing frame, and the fixing frame is connected to the first compensation unit and the second compensation unit.

15. The tilting mechanism as claimed in claim 11, wherein the tilting mechanism further comprises a fixing shaft, and the fixing shaft is connected to the first arm and the second arm.

16. The tilting mechanism as claimed in claim 15, wherein the fixing shaft extends parallel to rotation shafts of the left auxiliary wheel and the right auxiliary wheel, and the fixing shaft comprises a central point, and the central point is located between two ends of the fixing shaft.

17. The tilting mechanism as claimed in claim 16, wherein the fixing shaft comprises a post, the first arm comprises a compensation groove, the post is perpendicular to the fixing shaft, the fixing shaft rotates relative to the first arm to slide the post in the compensation groove, and the compensation groove is curved.

18. The tilting mechanism as claimed in claim 17, wherein the compensation groove comprises a first groove end, a second groove end and a groove center, the distance between the first groove end and the central point is greater than the distance between the groove center and the central point, and when the motor vehicle tilts toward the left auxiliary wheel, the post slides from the groove center to the first groove end.

19. The tilting mechanism as claimed in claim 16, wherein the tilting mechanism further comprises an elastic compensation element, and the elastic compensation element is disposed between the left auxiliary wheel and the first arm, and when the motor vehicle tilts, the elastic compensation element is compressed to keep the distance between the left auxiliary wheel and the right auxiliary wheel on the road unchanged.

20. The tilting mechanism as claimed in claim 19, wherein the elastic compensation element is a compression spring.

* * * * *